United States Patent [19]

Hobo et al.

[11] 4,015,426

[45] Apr. 5, 1977

[54] FUEL CONTROL SYSTEM

[75] Inventors: Nobuhito Hobo, Inuyama; Sumihiro Kaga, Inazawa, both of Japan

[73] Assignee: Nippondenso Co., Ltd., Japan

[22] Filed: Aug. 11, 1975

[21] Appl. No.: 603,512

Related U.S. Application Data

[63] Continuation of Ser. No. 416,280, Nov. 15, 1973, abandoned.

[30] Foreign Application Priority Data

Nov. 20, 1972  Japan ............................ 47-117047

[52] U.S. Cl. ...................... 60/39.28 R; 123/119 R
[51] Int. Cl.² ............................................ F02C 9/08
[58] Field of Search ............... 60/39.28 R, 39.28 T, 60/39.28 P, 39.29; 123/119 R

[56]  References Cited

UNITED STATES PATENTS

| | | | |
|---|---|---|---|
| 3,064,422 | 11/1962 | Heher | 60/39.28 R |
| 3,289,403 | 12/1966 | Opecht | 60/39.28 R |
| 3,418,805 | 12/1968 | Barish | 60/39.28 R |
| 3,521,606 | 7/1970 | Schmidt | 123/119 R |
| 3,664,124 | 5/1972 | Fehler | 60/39.28 R |
| 3,688,495 | 9/1972 | Fehler | 60/39.28 R |
| 3,691,405 | 9/1972 | Kendell | 60/39.28 T |
| 3,782,347 | 1/1974 | Schmidt | 123/119 R |
| 3,798,901 | 3/1974 | Lewenhaupt | 60/39.28 T |
| 3,876,326 | 4/1975 | Wertz | 60/39.29 |

Primary Examiner—Clarence R. Gordon
Attorney, Agent, or Firm—Cushman, Darby & Cushman

[57]  ABSTRACT

In a fuel control system of the type in which an electromagnetic valve responsive to timing pulse voltage is employed to intermittently effect the metering of the fuel, a control voltage generator generates a control voltage corresponding to a predetermined fuel metering characteristic of the engine, and a trigger signal generator triggers a timing pulse generator at a predetermined period to generate timing pulses whose time width is controllable in accordance with the control voltage to actuate an electromagnetic valve.

5 Claims, 10 Drawing Figures

FIG. 5
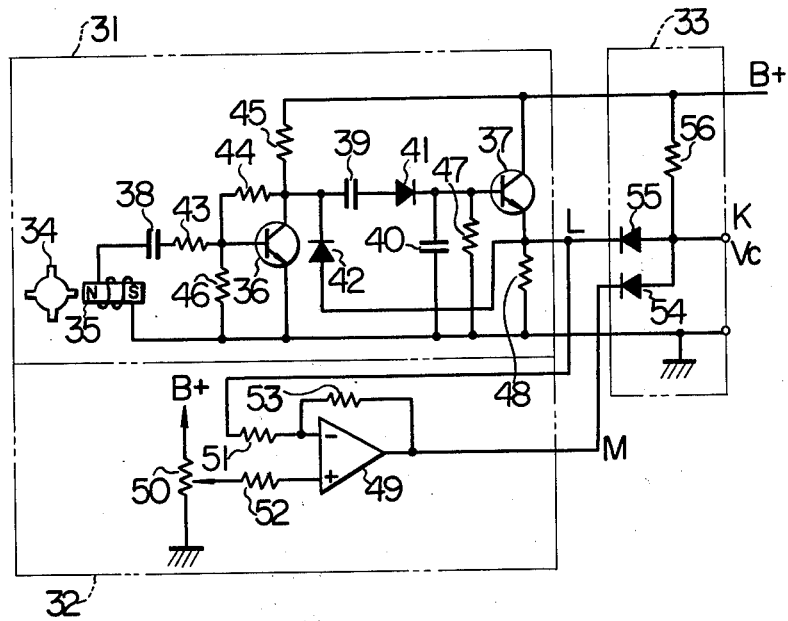
FIG. 6
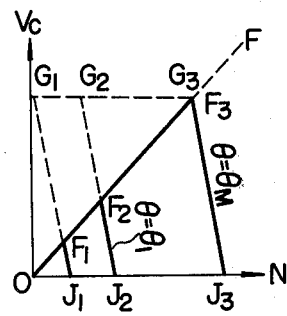
FIG. 7
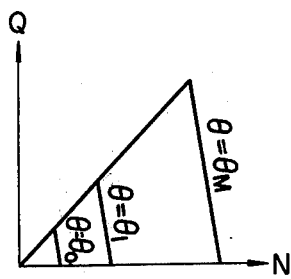
FIG. 8
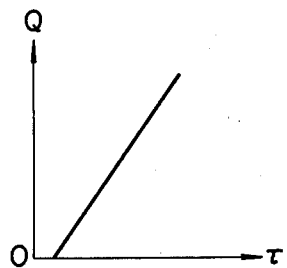
FIG. 9

FUEL CONTROL SYSTEM

This is a continuation, of application Ser. No. 416,280 filed Nov. 15, 1973, now abandoned.

BACKGROUND OF THE INVENTION

1. Field of the Invention

The present invention relates to a fuel control system of the type in which an electromagnetic valve responsive to timing pulse voltage is employed to intermittently open and close the passage for supplying fuel, whereby to control particularly the quantity of fuel delivered to the combustor of a gas turbine engine. U.S. Pat. No. 2,980,090 (Sutton et al) and U.S. Pat. No. 3,515,104 (Reichart) are the related patents which disclosed the prior art with which the present invention is concerned.

2. Description of the Prior Art

In known intermittent fuel metering systems of the type which employ an electromagnetic valve, the repetition period of timing pulses for opening the electromagnetic valve is varied in accordance with an engine operating parameter such as the rotational speed of the engine.

A disadvantage of this type of known system is that if it is used with an engine such as a gas turbine wherein the burning of fuel and air in the combustor is effected continuously, when the engine is in the low rotational speed range and the operating conditions are such that the quantity of the fuel delivered is small, the duration of the time when the electromagnetic valve is opened and fuel is delivered to the combustor is reduced and the duration of the time when the electromagnetic valve is closed is increased with the result that the pulsating of the fuel delivered to the combustor through the electromagnetic valve increases considerably thus failing to ensure a satisfactory burning in the combustor. This results in the generation of an abnormal combustion noise and further in the occurrence of misfiring if the pulsating of the fuel is very great. In this case, while the provision of for example a pressure damper in the fuel passage leading from the electromagnetic valve to the fuel injection nozzle of the combustor has the effect of reducing the pulsating of the fuel injected, there is a disadvantage in that the follow-up of the fuel injection quantity to the variation of the flow rate due to changes in the operating conditions is deteriorated by the fuel accumulating action of the pressure damper. Another disadvantage of the known system is that in the case of an automobile turbine having a wide range of variation for the rotary speed of the engine, if the repetition frequency of timing pulses for actuating the eltromagnetic valve in one engine rotary speed range is selected so high that the occurrence of the above-mentioned abnormal burning is prevented, the repetition frequency of the timing pulses tends to become excessively large in the higher rotary speed range with the result that the electromagnetic valve finds it difficult to conform with such a high repetition frequency and hence it is impossible to meter the fuel with high accuracy.

SUMMARY OF THE INVENTION

With a view to overcoming the foregoing difficulty, it is the object of the present invention to provide a fuel control system wherein the repetition period of timing pulses for determining the duration of the opening of an electromagnetic valve is maintained constant independently of changes in engine operating conditions and the time width of the timing pulses is varied in accordance with the engine operating conditions, whereby the quantity of fuel delivered to the combustor of a gas turbine is properly metered.

In accordance with the present invention, there is thus provided a fuel control system wherein the repetition period of timing pulses if fixed with the result that the repetition period can be selected so that the occurrence of abnormal burning in the combustor is prevented and moreover there is no difficulty for the follow-up of the electromagnetic valve. The fuel control system comprises a timing pulse generator for generating the requried timing pulses whose circuit construction is such that the voltage control of the pulse width of the timing pulses is possible, and a control voltage generator for detecting the operating conditions of the engine from the output signals of various detectors for detecting the operating parameters of the engine and generating a control voltage corresponding to a predetermined fuel metering characteristic, whereby the timing pulse generator is controlled by the control voltage thereby overcoming the above-mentioned difficulty of the conventional systems.

The system according to the present invention thus has a remarkable advantage in that since the repetition period of the operation of the electromagnetic valve is always maintained constant and the quantity of fuel delivered to the engine is varied by controlling the time width of the timing pulses, it is possible to always ensure a satisfactory burning within the combustor of the engine as well as the metering of the fuel with greater accuracy.

BRIEF DESCRIPTION OF THE DRAWING

FIG. 5 is a wiring diagram showing an embodiment of the control voltage generator used in the system of this invention.

FIG. 6 is a diagram showing the output voltage characteristics at various points in the control voltage generator shown in FIG. 5.

FIG. 7 is a fuel metering characteristic diagram of the system according to the invention.

FIG. 8 is a diagram showing the relationship between the time width of timing pulse for actuating electromagnetic valves and the quantity of fuel delivered therethrough.

FIG. 9 is a diagram showing the relationship between the control voltage and the time width of the timing pulses generated by the timing pulse generator in the system of this invention.

DESCRIPTION OF THE PREFERRED EMBODIMENT

The present invention will be described in greater detail with reference to the illustrated embodiment.

Figure 1:
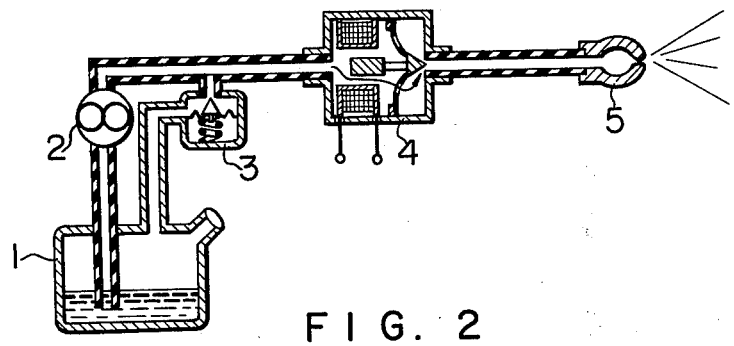
FIG. 1 is a schematic diagram of a fuel feed system with which a fuel control system according to the present invention may be utilized.

Referring first to FIG. 1 illustrating a fuel feed system with which the fuel control system of the present invention may be utilized, numeral 1 designates a fuel reservoir, 2 a fuel feed pump, 3 a pressure regulator, 4 an electromagnetic valve, 5 an injection nozzle.

The discharge pressure of the fuel feed pump, i.e. the fuel pressure at the fuel inlet of the electromagnetic valve 4 is regulated to a constant pressure of several atmospheric pressure by the pressure regulator 3. The electromagnetic valve 4 is a so-called pulse responsive valve which is opened only upon application of a timing pulse voltage thereto and it remains open for a length of time determined by the timing pulse to open the passage leading from the fuel feed pump 2 to the injection nozzle 5 which in turn injects the fuel into the combustor of a gas turbine engine.

Figure 2:
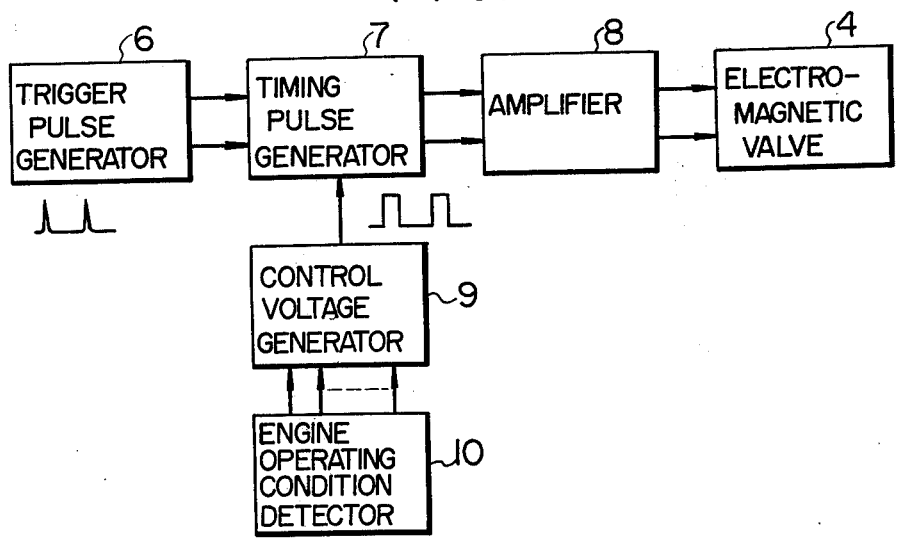
FIG. 2 is a block diagram showing an embodiment of the fuel control system according to the present invention.

FIG. 2 is a block diagram showing an embodiment of the gas turbine fuel control system according to the present invention. In FIG. 2, numeral 6 designates a trigger pulse generator, 7 a timing pulse generator, 8 an amplifier, 4 an electromagnetic valve, 9 a control voltage generator, 10 an engine operating condition detector. The trigger pulse generator 6 generates trigger pulses for triggering the timing pulse generator 7 with a predetermined period. The repetition period of the trigger pulses is selected so that the operating period of the electromagnetic valves 4 responsive to the timing pulses has a suitable valve that prevents the occurrence of abnormal burning in the combustor of the gas turbine engine and also causes no difficulty for the follow-up of the electromagnetic valve 4. The timing pulse generator 7 generates a timing pulse each time a trigger pulse is applied thereto. For the duration of a time width $\tau$ determined by the timing pulse the electromagnetic valve 4 is opened and the passage for the fuel is opened to meter the fuel and feed the thus metered fuel Q to the fuel nozzle side. FIG. 8 shows the characteristic obtained in this case. Further, the time width $\tau$ of the timing pulse varies as shown in FIG. 9 in accordance with the control voltage $V_C$. The control voltage generator 9 functions as a function generator which receives as its input signals the detected signals from the operating condition detector 10 for detecting the operating parameters of the gas turbine engine, such as, the number of revolutions of the engine, the position of the accelerator lever, the pressure of the drawn air, the temperature at various portions of the engine and the like, whereby it detects the operating conditions of the engine and generates a control voltage corresponding to a predetermined fuel feed quantity characteristic in accordance with the detected operating conditions. The amplifier 8 is a circuit for amplifying the timing pulse generated by the timing pulse generator 7 to a current level sufficient to actuate the electromagnetic valve 4. The electromagnetic valve 4 stays open during the time when the timing pulse is applied thereto so that the fuel feed passage is opened for the duration of this time to feed the fuel in an amount proportional to the pulse width of the timing pulse and thereby to effect the metering of the fuel. When no timing pulse is applied to the electromagnetic valve 4, it is maintained in the closed condition with the result that no fuel is delivered therethrough and hence the metering of the fuel is not effected.

Figure 3:
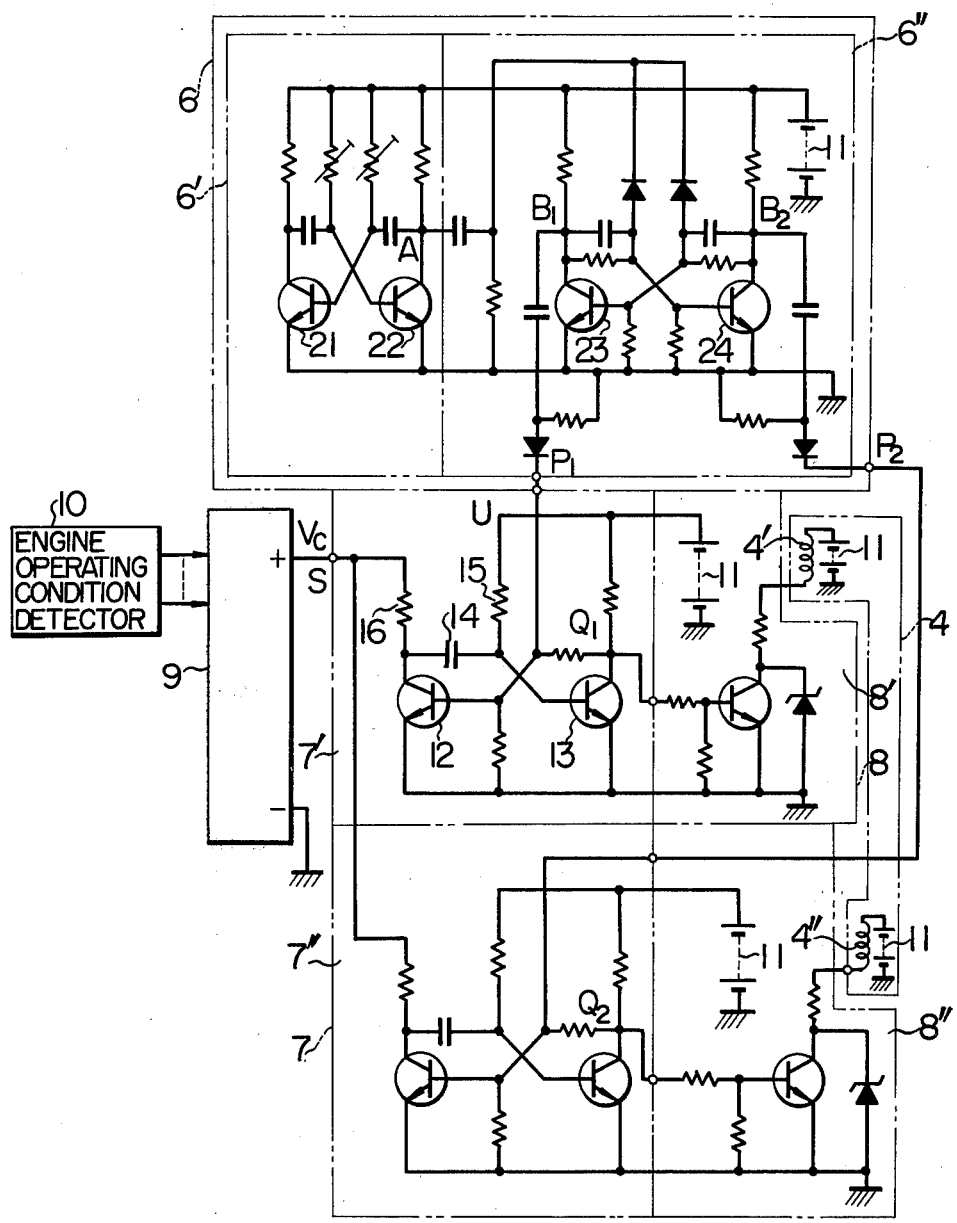
FIG. 3 is a wiring diagram showing an embodiment of the principal electric circuitry of the system according to the invention.

Referring now to FIG. 3 showing a circuit diagram of the embodiment of FIG. 1, the construction of the individual circuits will be described in greater detail. In FIG. 3, numeral 6 designates the trigger pulse generator, 7' and 7" timing pulse generators, 8' and 8" amplifiers, 4' and 4" magnet coils for the electromagnetic valves 4, 9 the control voltage generator.

Figure 4:
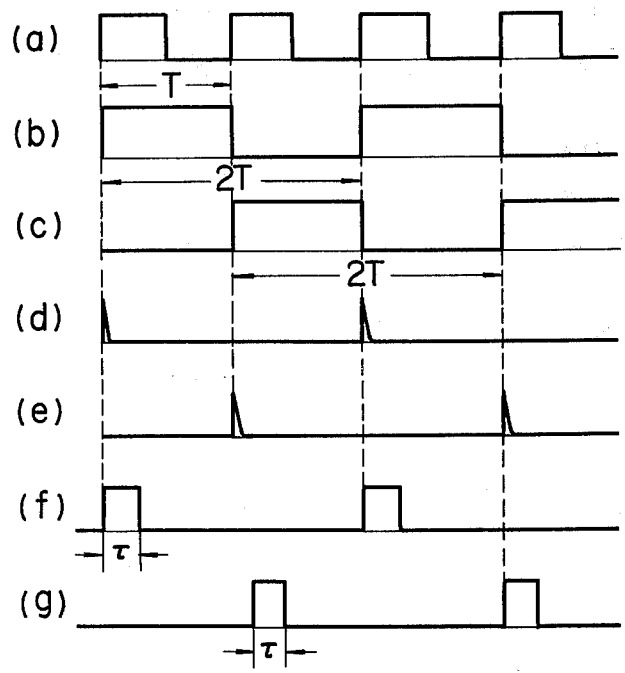
FIG. 4 is a diagram showing waveforms generated at various points in the system of this invention.

This embodiment shows an exemplary fuel control arrangement comprising two electromagnetic valves which are operated in such a manner that their operating periods are separated by a half period and therefore the timing pulse generator 7 comprises the two timing pulse generators 7' and 7". As a result, the trigger pulse generator 6 for triggering the two timing pulse generators 7' and 7" must generate two trigger pulses which are out of phase by a half period. The trigger pulse generator 6 comprises a reference period pulse generator 6' consisting of an astable multivibrator composed of transistors 21 and 22 to generate pulses having a reference period, and a bistable multivibrator 6" composed of transistors 23 and 24 to generate two pulses which are out of phase by a half period, whereby a pair of trigger signals which are out of phase by a half period are generated respectively at trigger pulse output points P1 and P2. The repetition period of the two trigger signals is twice that of the reference period pulse. This phase relation is shown in FIG. 4 with FIG. 4(a) showing the voltage waveform generated at an output point A of the reference period pulse generator 6', FIGS. 4(b) and 4(c) the voltage waveforms generated at output points B1 and B2 of the bistable multivibrator 6", and FIGS. 4(d) and 4(e) the voltage waveforms generated at the trigger signal output points P1 and P2. In this exemplary arrangement, the circuit construction of the timing pulse generators 7' and 7" is such that timing pulse width of an RC coupled monostable timing circuit is controlled by the control voltage. Since the timing pulse generators 7' and 7" are of the same circuit construction, only the circuit construction of the timing pulse generator 7' will be described in detail.

The timing pulse generator 7' comprises an RC coupled monostable timing circuit composed of transistors 12 and 13. In the stable state of this circuit, the transistor 12 is rendered nonconductive and the transistor 13 is rendered conductive. In this condition, since the collector of the transistor 12 is connected to a control voltage application point S through a resistor 16, a capacitor 14 for determining the time constant is charged to a value substantially equal to the control voltage $V_C$ through a charging path comprising the resistor 16 and the base and the emitter of the transistor 13. When a trigger pulse is applied to the base of the transistor 12, the monostable timing circuit is switched to the so-called unstable state wherein the transistor 12 is rendered conductive and the transistor 13 is rendered nonconductive. In this unstable state, the charge on the capacitor 14 is discharged through a discharging path extending from the emitter and the collector of the transistor 12 to a point U through a resistor 15 for determining the time constant. This unstable state is terminated at the instant when the potential at the base of the transistor 13 becomes higher than the emitter potential so that the circuit is switched back to the original stable state wherein the transistor 12 is again rendered nonconductive and the transistor 13 conductive. And when the circuit is in the unstable state, a timing pulse of positive polarity is delivered from a collector output point $Q_1$ of the transistor 13 and the time width $\tau$ of the timing pulse is approximately given by the following equation:

$$\tau \approx RC \frac{V_C}{V_B} \text{ (sec)}$$

where R is the resistance value $\Omega$ of the resistor 15 constituting a time constant element, C is the capacitance (F) of the capacitor 14, $V_B$ is applied voltage (V) at point U, and $V_C$ is the applied voltage at point S.

In this case, if the values of the time constant elements, i.e. the resistor 15 and the capacitor 14 and the applied voltage $V_B$ at the point U are maintained constant, the timing pulse width $\tau$ varies substantially in proportion to the applied voltage at the point S. Accordingly, by applying the control voltage $V_C$ to the point S, the timing pulse width $\tau$ can be controlled in proportion to the voltage $V_C$. The control voltage generator 9 detects operating conditions of the engine from the output signals of such detectors as an electromagnetic transducer for detecting the number of revolutions of the engine, a potentiometer operatively associated with the position of an accelerator actuating lever to detect the position thereof, a pressure sensor for detecting the pressure of drawn air and a thermocouple temperature sensor for detecting the temperature of drawn air or exhaust gases, whereby a control voltage for determining a predetermined fuel metering characteristic in accordance with the operating conditions of the engine is generated. Thus, the control voltage generator 9 may be of the same circuit construction as an analog type function generator.

Since the accuracy of the metering of the fuel can be improved in proportion to an improvement in the accuracy of the measurement of such operating parameters of the engine, a variety of detectors for detecting the required operating parameters of the engine must be employed. FIG. 5 shows an exemplary embodiment of the control voltage generator 9. In the control voltage generator 9 shown in FIG. 5, a revolution detector for detecting the engine rotational speed N and a detector for detecting the position of an accelerator actuating lever are employed. Accordingly, the control voltage generator 9 of FIG. 5 comprises a speed voltage generator 31 for detecting the rotational speed N of the engine to generate a voltage proportional to the rotational speed N, a part load control voltage generator 32 for determining the part load characteristic of the engine in accordance with the position of the accelerator actuating lever, and a low selector circuit 33 for comparing the speed voltage with the part load voltage and selecting the lower one of the two voltages, whereby the final control voltage $V_C$ for determining the operating conditions of the engine is generated at the output terminal of the low selector circuit 33. In the speed voltage generator 31, numeral 34 designates an inductor linked to the rotary shaft of the engine, 35 an electromagnetic pickup for generating a pulse voltage having a repetition frequency proportional to the rotational speed N of the inductor 34. Numeral 36 designates an amplifying transistor, 37 an emitter follower transistor, 38, 39 and 40 capacitors, 41 and 42 diodes, 43, 44, 45, 46, 47 and 48 resistors. With this construction, the speed voltage proportional to the engine rotational speed N is generated at a point L. This speed voltage has the same characteristic as indicated by the straight line OF in FIG. 6.

In the part load control voltage generator 32, numeral 49 designates a differential operational amplifier, 50 a potentiometer operatively connected to the accelerator actuating lever, 51, 52 and 53 resistors. The speed voltage is applied to the inverting input of the operational amplifier 49, and the output voltage of the potentiometer 50 operatively connected to the accelerator actuating lever is applied as an input voltage to the noninverting input of the operational amplifier 49. Consequently, the voltage generated at an output point M is obtained along the line connecting the broken and solid lines in FIG. 6 with the position of the accelerator actuating lever as a parameter. In this case, when the degree of movement $\theta$ of the accelerator actuating lever has the minimum valve of $\theta_0$, a part load control voltage $V_C$ is determined in accordance with the revolutions N along the line connecting points $G_1$, $F_1$, $J_1$ and $J_3$, whereas it is determined along the line $G_3F_3J_3$ when $\theta$ has the maximum value of $\theta_M$ and along the line of for example $G_1G_2F_2J_3$ when $\theta = \theta_1$ ($\theta_0 < \theta_1 < \theta_M$). The low selector circuit 33 compares the thus obtained part load control voltage with the speed voltage to always select the lower one of the two voltages and it comprises diodes 54 and 55 and a resistor 56. Consequently, the control voltage $V_C$ generated at an output point K is determined in accordance with the engine rotational speed N along the line $OG_3(F_3)J_3$ when $\theta = \theta_M$, along the line $OF_1J_1J_3$ when $\theta = \theta_0$ and along the line $OF_2J_2J_3$ when $\theta = \theta_1$.

The pulse width of the timing pulses generated at an output terminal $Q_2$ of the timing pulse generator 7' is similarly controlled in accordance with the operating conditions of the engine.

In this case, however, the trigger signals of the two timing pulse generators 7' and 7'' are out of phase by a half period and consequently the waveforms of the timing pulse generated at the output points $Q_1$ and $Q_2$ are out of phase by a half period as shown in FIGS. 4(f) and 4(g).

The two timing pulse are applied respectively through the amplifiers 8' and 8'' to the magnet coils 4' and 4'' and thus the electromagnetic valves are actuated to remain open for the time duration of the timing pulses, whereby to feed the fuel under pressure from the fuel feed pump 2 to the combustor of the gas turbine engine. Since the timing pulse generators 7' and 7'' are triggered by the trigger signals which are out of phase by a half period, the opening phases of the two electromagnetic valves differ from each other by a half period and hence they feed the fuel alternately.

Since the repetition period of the trigger signals from the trigger pulse generator 6 is fixed, the repetition period of the alternate opening conditions of the two electromagnetic valves is also maintained constant. The time duration of the opening of the electromagnetic valve per single operation thereof is determined by the timing pulse width and this timing pulse width is in turn dependent on the control voltage $V_C$ determined according to the operating conditions of the engine. Consequently, the fuel quantity Q fed to the engine in a unit time from the electromagnetic valves shows the rotational speed N versus fuel feed quantity characteristic as shown in FIG. 7 which has the similar pattern as the control voltage characteristic shown in FIG. 6.

While, in the above-mentioned embodiment of this invention, two timing pulse generators are provided and thus they are triggered alternately with a phase difference of a half period, it is of course possible to obtain the desired results with a single timing pulse generator. In this case, the trigger signals for the other timing pulse generator are not necessary and therefore it is apparent that the circuits designated by reference nunmerals 6'', 7'' and 8'' may be eliminated.

Figure 10:
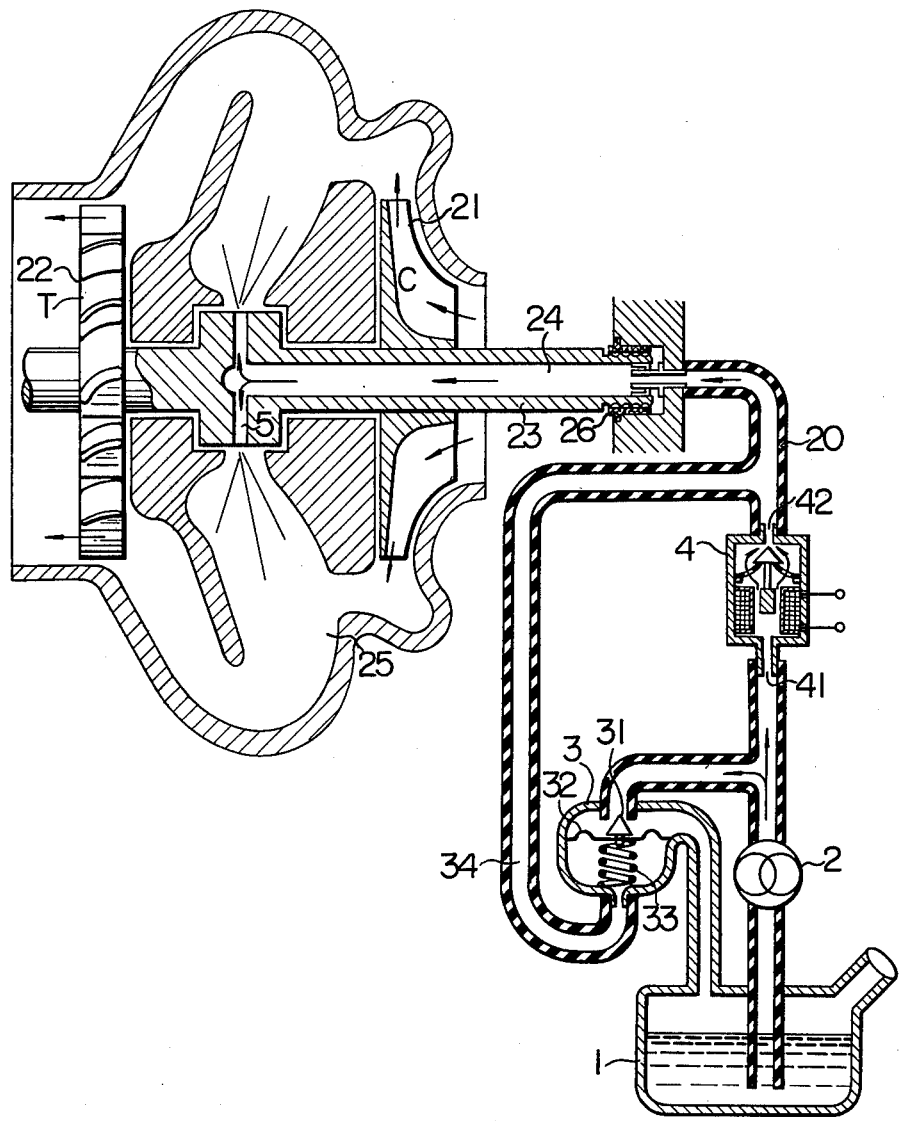
FIG. 10 is a schematic diagram showing a turbine fuel feed system with a rotating nozzle with which the system of this invention may be utilized.

While, in the embodiment shown in FIG. 1, the injection nozzle 5 comprises a fixed nozzle provided in the fuel passage connected to the electromagnetic valve 4 and opening into the combustor of the gas turbine, a rotating nozzle may be mounted on the turbine shaft of the fuel feed system shown in FIG. 10. In the fuel feed arrangement of FIG. 10, the component parts designated by reference numerals 1 through 4 are identical with the corresponding ones in the embodiment of FIG. 1, and the fuel fed through the electromagnetic valve 4 is directed through a rubber hose 20 into a passage 24 formed in the central portion of a rotary shaft 23 interconnecting a turbine 22 and a compressor 21 of the gas turbine, whereby the fuel is injected through the nozzle 5 extending through that portion of the rotating shaft 23 contained in a combustor 25. Numeral 26 designates a labyrinth seal. In this case, since the nozzle 5 consists of a rotating nozzle which rotates in association with the rotary shaft 23 of the turbine, a centrifugal force corresponding to the turbine rotational speed acts on the fuel passed through the nozzle 5 with the result that the atomization of the fuel is facilitated and moreover the heat is transmitted from the heated rotary shaft 23 to the fuel passing through the passage 24 in the rotary shaft 23, thus facilitating vaporization of the fuel and ensuring a satisfactory atomization of the fuel. In this arrangement, since the fuel fed through the electromagnetic valve 4 flows through the rubber hose 20, if the frequency of the opening and closing of the electromagnetic valve 4 is higher than a certain value, the ripple component of the fuel pressure caused by the opening and closing of the electromagnetic valve 4 is subjected to the damping effect due to the elasticity of the rubber hose 20 and thus the fuel flowing through the nozzle 5 can be considered as a continuous flow. In accordance with the present invention, therefore, a fuel feed system can be provided in which the repetition frequency of trigger pulses generated from the trigger pulse generator and hence the frequency of opening and closing of the electromagnetic valve is selected in such a manner that the damping effect of the rubber hose 20 is fully exercised and the flow of the fuel injected from the nozzle 5 is considered as a continuous injection.

Further, in the fuel feed arrangement of FIG. 10, when the electromagnetic valve 4 is in the open condition, the output fuel pressure of the electromagnetic valve 4 is applied through a line 34 to one end of a diaphragm 32 of the pressure regulator 3 in such a manner that the differential pressure between its inlet 41 and outlet 42 is maintained constant. Since the fuel pressure acts on the upper surface of the diaphragm 32 and the force of a spring 33 and the outlet fuel pressure of the electromagnetic valve 4 act on the lower surface of the diaphragm 32, the regulated fuel pressure of the pressure regulator 3 is the sum of the set pressure of the spring 33 and the outlet fuel pressure of the electromagnetic valve 4 and hence the differential fuel pressure between the inlet 41 and output 42 of the electromagnetic valve 4 is maintained constant. While the fuel pressure near the outlets of the nozzle 5 varies in accordance with the outlet fuel pressure of the compressor 21 and operating parameters such as the rotational speed of the rotary nozzle 5 and the like, the differential pressure between the inlet 41 and outlet 42 of the electromagnetic valve 4 is always maintained at a constant pressure dependent on the force of the spring 33 in the pressure regulator 3 in the above-described manner. Further, if the differential pressure between the inlet 41 and outlet 42 of the electromagnetic valve 4 is represented as $\Delta P$, the timing pulse width as $\tau(\sec)$ and the repetition frequency of the timing pulse as f (Hz), then the fuel quantity Q delivered through the electromagnetic valve 4 is given as $Q = C\tau f \sqrt{\Delta P}$ (where C is a proportional constant). In this case, a change in the outlet fuel pressure of the electromagnetic valve 4 caused by a change in the operating conditions is reflected in the set pressure of the pressure regulator 3 with the result that the fuel pressure at the inlet 41 of the electromagnetic valve 4 is varied correspondingly to provide the required compensation and thereby to maintain constant the differential pressure between the inlet 41 and outlet 42 of the electromagnetic valve 4. In this way, the quantity of fuel corresponding to a predetermined fuel feed characteristic can alway be supplied.

We claim:
1. A fuel control system for a gas turbine engine which has a fuel feed pump and an injection nozzle, comprising:
   a. electromagnetic valve means including first and second systems of electromagnetic valves inserted, in parallel with each other, between said fuel feed pump and said injection nozzle;
   b. a control voltage generator for generating a control voltage corresponding to a predetermined fuel metering characteristic of said gas turbine engine, said control voltage generator including:
      first detecting means for generating a first control voltage responsive to engine rotational speed,
      second detecting means for generating a second control voltage responsive to engine load,
      selector means connected to said first and second detecting means for selecting one of said two control voltages;
   c. a trigger signal generator for generating a trigger signal having a predetermined period;
   d. a timing pulse generator connected to said control voltage generator and to said trigger signal generator for alternately generating first and second timing pulse signals each time said trigger signal is generated, the pulse width of said first and second timing pulse signals varying in accordance with said control voltage; and
   e. an amplifier connected to said timing pulse generator for amplifying said timing pulse signals and applying the amplified signals to said first and second systems to alternately actuate said first and second systems of electromagnetic valves in said electromagnetic valve means whereby fuel is supplied smoothly to said gas turbine engine.

2. A fuel control system according to claim 1, wherein said trigger signal generator comprises:
   an astable multivibrator
   and a bistable multivibrator connected to said astable multivibrator.

3. A fuel control system according to claim 2, wherein said timing pulse generator comprises two monostable multivibrators connected to a pair of terminals of said bistable multivibrator.

4. A fuel control system according to claim 3, wherein each of said monostable multivibrators comprises a series circuit of a capacitor and a resistor for determining a time constant, and one end of said series circuit is connected to said control voltage generator and the other end of said series circuit is connected to a power source.

5. A fuel control system according to claim 1, wherein said
second detecting means includes a detector for generating a voltage responsive to position of an accelerator actuating lever, and said selector circuit means includes a circuit for selecting the lower one of said two control voltages.

* * * * *